(12) United States Patent
Zhou et al.

(10) Patent No.: US 10,986,289 B2
(45) Date of Patent: Apr. 20, 2021

(54) METHOD AND DEVICE FOR REGULATING IMAGING ACCURACY OF MOTION-SENSING CAMERA

(71) Applicant: NANJING HUAJIE IMI TECHNOLOGY CO.,LTD, Jiangsu (CN)

(72) Inventors: Xiaojun Zhou, Jiangsu (CN); Li Li, Jiangsu (CN); Hang Wang, Jiangsu (CN); Zan Sheng, Jiangsu (CN); Shuo Li, Jiangsu (CN)

(73) Assignee: NANJING HUAJIE IMI TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 16/641,653

(22) PCT Filed: Jan. 8, 2019

(86) PCT No.: PCT/CN2019/070760
§ 371 (c)(1),
(2) Date: Feb. 25, 2020

(87) PCT Pub. No.: WO2019/137348
PCT Pub. Date: Jul. 18, 2019

(65) Prior Publication Data
US 2021/0006734 A1    Jan. 7, 2021

(30) Foreign Application Priority Data
Jan. 10, 2018   (CN) .......................... 201810024754.9

(51) Int. Cl.
*H04N 5/00*    (2011.01)
*H04N 5/351*   (2011.01)
*G06K 9/20*    (2006.01)
*G06K 9/46*    (2006.01)
*H04N 5/33*    (2006.01)

(52) U.S. Cl.
CPC ............. *H04N 5/351* (2013.01); *G06K 9/209* (2013.01); *G06K 9/4661* (2013.01); *H04N 5/33* (2013.01)

(58) Field of Classification Search
CPC .......... H04N 5/351; H04N 5/33; G06K 9/209; G06K 9/4661
See application file for complete search history.

(56) References Cited

U.S. PATENT DOCUMENTS

| 10,177,527 | B2 * | 1/2019 | Dummer | ............. | H01S 5/02257 |
| 2007/0165208 | A1 * | 7/2007 | Cowburn | ............. | G03G 21/046 356/71 |

(Continued)

FOREIGN PATENT DOCUMENTS

| CN | 102622591 | 8/2012 |
| CN | 106412426 | 2/2017 |

(Continued)

OTHER PUBLICATIONS

"International Search Report (Form PCT/ISA/210) of PCT/CN2019/070760," dated Mar. 26, 2019, with English translation thereof, pp. 1-4.

*Primary Examiner* — Frank F Huang
(74) *Attorney, Agent, or Firm* — JCIP Global Inc.

(57) ABSTRACT

Disclosed is a method and device for regulating imaging accuracy of a motion-sensing camera. The method comprises: acquiring an infrared speckle pattern in a target infrared scene; recognizing an actual definition, an actual speckle regularity, and an actual central region brightness of the infrared speckle pattern; comparing the actual definition with a preset definition, the actual speckle regularity with a preset speckle regularity, and the actual central region brightness with a preset brightness; and adjusting an imaging focal length according to a comparison result, and completing regulation of the imaging accuracy. In this way, (Continued)

the method for regulating imaging accuracy of a motion-sensing camera of the present invention can obtain an infrared speckle pattern having required imaging accuracy. Thus, the quality of a depth map formed by conversion from the infrared speckle pattern can be highly improved, which provides a high-quality data source for subsequent skeleton-based recognition and gesture recognition.

12 Claims, 2 Drawing Sheets

(56) References Cited

U.S. PATENT DOCUMENTS

| | | | |
|---|---|---|---|
| 2008/0112596 A1* | 5/2008 | Rhoads | G07D 7/121 |
| | | | 382/115 |
| 2008/0212838 A1* | 9/2008 | Frigerio | G06T 7/269 |
| | | | 382/107 |
| 2013/0107002 A1 | 5/2013 | Kikuchi | |
| 2015/0289762 A1* | 10/2015 | Popovich | A61B 3/113 |
| | | | 351/209 |
| 2016/0321502 A1* | 11/2016 | Kamath | H04N 5/2256 |
| 2017/0032527 A1* | 2/2017 | Murthy | H04N 5/33 |
| 2018/0061039 A1* | 3/2018 | Cauble | G06K 9/0014 |
| 2018/0293739 A1* | 10/2018 | Gupta | G06K 9/4642 |
| 2019/0041197 A1* | 2/2019 | Gernoth | G06T 7/74 |
| 2020/0034608 A1* | 1/2020 | Nduka | G06K 9/209 |
| 2020/0389642 A1* | 12/2020 | Xu | G06K 9/00221 |

FOREIGN PATENT DOCUMENTS

| | | |
|---|---|---|
| CN | 106502379 | 3/2017 |
| CN | 108234874 | 6/2018 |

\* cited by examiner

METHOD AND DEVICE FOR REGULATING IMAGING ACCURACY OF MOTION-SENSING CAMERA

CROSS-REFERENCE TO RELATED APPLICATION

This application is a 371 application of the International PCT application serial no. PCT/CN2019/070760, filed on Jan. 8, 2019, which claims the priority benefit of China Patent Application No. 201810024754.9, filed on Jan. 10, 2018. The entirety of each of the above mentioned patent applications is hereby incorporated by reference herein and made a part of this specification.

BACKGROUND OF THE INVENTION

Field of the Invention

The present invention relates to the application field of motion sensing technology, and in particular, to a method for regulating imaging accuracy of a motion-sensing camera and a device for regulating imaging accuracy of a motion-sensing camera.

Description of Related Art

At present, the development of motion-sensing cameras provides a fully new way of man-machine interaction. Such a novel control method depending on movement of the human body provides a new option for routine ways of man-machine interaction. Currently, some of commercially available motion-sensing cameras use infrared emission and receiving modules. The definition of an infrared image determines the quality of a depth map, and ultimately affects the quality of skeleton-based recognition, gesture recognition, and other application aspects. Thus, accuracy of the infrared image is the first key point in implementing an excellent way of motion sensing control.

With continuous development of infrared CMOS technology in recent years, the manufacturing technique of infrared CMOS camera modules continuously changes, which improves operability of the motion sensing control in another aspect, facilitates the development of the motion sensing technology, and further affects capture of the infrared images at varying degrees. The difference in design of motion-sensing devices and a direct combination of the device and the infrared CMOS camera module bring out an issue of determining the accuracy of an infrared image formed by means of the CMOS.

Therefore, how to regulate imaging accuracy of a motion-sensing camera according to an infrared speckle pattern becomes a technical problem in urgent need to be solved in this field.

SUMMARY OF THE INVENTION

The present invention aims to solve at least one of the technical problems in the prior art, and provide a method for regulating imaging accuracy of a motion-sensing camera and a device for regulating imaging accuracy of a motion-sensing camera.

To achieve the foregoing objectives, a first aspect of the present invention provides a method for regulating imaging accuracy of a motion-sensing camera, which comprises:

S110: acquiring an infrared speckle pattern in a target infrared scene;

S120: based on the infrared speckle pattern, recognizing an actual definition, an actual speckle regularity, and an actual central region brightness of the infrared speckle pattern;

S130: comparing the actual definition with a preset definition; and when the actual definition is consistent with the preset definition, proceeding to step S140, or when the actual definition is inconsistent with the preset definition, adjusting an imaging focal length of the motion-sensing camera and repeating steps S110 to S130;

S140: comparing the actual speckle regularity with a preset speckle regularity; and when the actual speckle regularity is consistent with the preset speckle regularity, proceeding to step S150, or when the actual speckle regularity is inconsistent with the preset speckle regularity, adjusting the imaging focal length of the motion-sensing camera and repeating steps S110 to S140; and S150: comparing the actual central region brightness with a preset brightness; and when the actual central region brightness is consistent with the preset brightness, completing regulation of the imaging accuracy of the motion-sensing camera, or when the actual central region brightness is inconsistent with the preset brightness, adjusting the imaging focal length of the motion-sensing camera and repeating steps S110 to S150.

Preferably, the method further comprises the following step before step S110:

S101: configuring a light source unit, to emit infrared light to the target infrared scene, wherein the light source unit includes at least one light source.

Preferably, the light source includes a structured light source.

Preferably, step S120 includes:

based on the infrared speckle pattern, recognizing an edge grey gradient of the infrared speckle pattern, and using the grey gradient as the actual definition;

step S130 includes:

comparing the edge grey gradient with a preset grey gradient, and when the edge grey gradient is consistent with the preset grey gradient, determining that the actual definition is consistent with the preset definition.

Preferably, step S120 includes:

dividing the infrared speckle pattern into at least one target detection region; and recognizing a speckle distribution and/or speckle shape in each of the target detection region, and using the speckle distribution and/or speckle shape in the target detection region as the actual speckle regularity;

step S140 includes:

comparing the speckle distribution and/or speckle shape in each target detection region with a preset speckle distribution and/or preset speckle shape, and when the speckle distribution and/or speckle shape in the target detection region is consistent with the preset speckle distribution and/or preset speckle shape, determining that the actual speckle regularity is consistent with the preset speckle regularity.

Preferably, step S120 includes:

selecting a predetermined range from a central region of the infrared speckle pattern; and calculating a whole brightness average value of the predetermined range in the central region of the infrared speckle pattern, and using the whole brightness average value as the actual central region brightness;

step S150 includes:

comparing the whole brightness average value with a preset regional brightness threshold, and when the whole brightness average value is consistent with the preset regional brightness threshold, determining that the actual central region brightness is consistent with the preset brightness.

A second aspect of the present invention provides a device for regulating imaging accuracy of a motion-sensing camera, the motion-sensing camera comprising an infrared CMOS camera module, the regulating device comprising a recognition module, an infrared speckle definition module, an infrared speckle regularity module, an infrared speckle center brightness module, and an imaging accuracy regulating module, wherein the infrared CMOS camera module is configured to acquire an infrared speckle pattern in a target infrared scene;

the recognition module is configured to, based on the infrared speckle pattern, recognize an actual definition, an actual speckle regularity, and an actual central region brightness of the infrared speckle pattern;

the infrared speckle definition module is configured to compare the actual definition with a preset definition; and when the actual definition is consistent with the preset definition, send a definition matching signal to the infrared speckle regularity module, or when the actual definition is inconsistent with the preset definition, send a definition mismatching signal to the imaging accuracy regulating module;

the infrared speckle regularity module is configured to compare the actual speckle regularity with a preset speckle regularity; and when the actual speckle regularity is consistent with the preset speckle regularity, send a speckle regularity matching signal to the infrared speckle center brightness module, or when the actual speckle regularity is inconsistent with the preset speckle regularity, send a speckle regularity mismatching signal to the imaging accuracy regulating module;

the infrared speckle center brightness module is configured to compare the actual central region brightness with a preset brightness; and when the actual central region brightness is consistent with the preset brightness, complete regulation of the imaging accuracy of the infrared CMOS camera module, or when the actual central region brightness is inconsistent with the preset brightness, send a brightness mismatching signal to the imaging accuracy regulating module; and the imaging accuracy regulating module is configured to adjust an imaging focal length of the infrared CMOS camera module according to the definition mismatching signal, the speckle regularity mismatching signal, and the brightness mismatching signal.

Preferably, the motion-sensing camera also includes an infrared emission module which includes a light source unit, configured to emit infrared light to the target infrared scene, the light source unit including at least one light source.

Preferably, the recognition module is configured to, based on the infrared speckle pattern, recognize an edge grey gradient of the infrared speckle pattern, and use the grey gradient as the actual definition;

the recognition module is configured to divide the infrared speckle pattern into at least one target detection region, recognize a speckle distribution and/or speckle shape in each of the target detection region, and use the speckle distribution and/or speckle shape in the target detection region as the actual speckle regularity; and the recognition module is configured to select a predetermined range from a central region of the infrared speckle pattern, and calculate a whole brightness average value of the predetermined range in the central region of the infrared speckle pattern, and use the whole brightness average value as the actual central region brightness.

Preferably, the infrared speckle definition module is configured to compare the edge grey gradient with a preset grey gradient, and when the edge grey gradient is consistent with the preset grey gradient, determine that the actual definition is consistent with the preset definition;

the infrared speckle regularity module is configured to compare the speckle distribution and/or speckle shape in each target detection region with a preset speckle distribution and/or preset speckle shape, and when the speckle distribution and/or speckle shape in each of the target detection region is consistent with the preset speckle distribution and/or preset speckle shape, determine that the actual speckle regularity is consistent with the preset speckle regularity; and the infrared speckle center brightness module is configured to compare the whole brightness average value with a preset regional brightness threshold, and when the whole brightness average value is consistent with the preset regional brightness threshold, determine that the actual central region brightness is consistent with the preset brightness.

In the method for regulating imaging accuracy of a motion-sensing camera of the present invention, an actual definition, an actual speckle regularity, and an actual central region brightness of an acquired infrared speckle pattern in a target infrared scene are recognized, and an imaging focal length of the motion-sensing camera is adjusted according to the actual definition, the actual speckle regularity, and the actual central region brightness, so as to obtain an infrared speckle pattern having required imaging accuracy. Thus, the quality of a depth map formed by conversion from the infrared speckle pattern can be highly improved, which provides a high-quality data source for subsequent skeleton-based recognition and gesture recognition.

The device for regulating imaging accuracy of a motion-sensing camera of the present invention recognizes an actual definition, an actual speckle regularity, and an actual central region brightness of an acquired infrared speckle pattern in a target infrared scene, and adjusts an imaging focal length of the motion-sensing camera according to the actual definition, the actual speckle regularity, and the actual central region brightness, so as to obtain an infrared speckle pattern having required imaging accuracy. Thus, the quality of a depth map formed by conversion using the infrared speckle pattern can be highly improved, which provides a high-quality data source for subsequent skeleton-based recognition and gesture recognition.

BRIEF DESCRIPTION OF THE DRAWINGS

The accompanying drawings provide a further understanding of the present invention and form part of the specification. The accompanying drawings are used to explain the present invention together with the following specific embodiments, and not intended to limit the present invention.

DETAILED DESCRIPTION OF THE INVENTION

Specific embodiments of the present invention are described in detail below with reference to the accompanying drawings. It should be understood that, the specific embodiments described herein are merely used to describe and explain the present invention, and not intended to limit the present invention.

Figure 1:
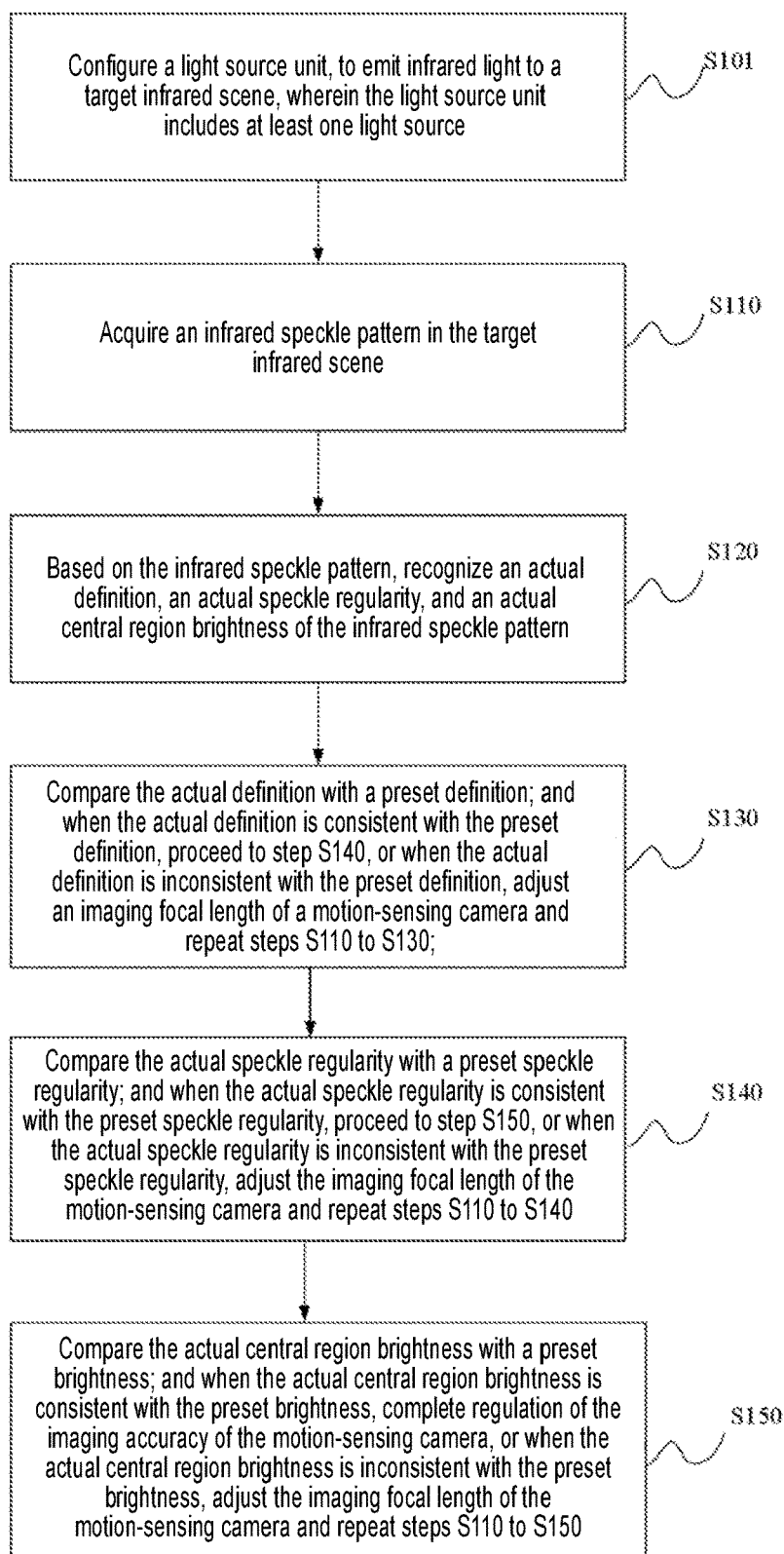
FIG. 1 is a flowchart of a method for regulating imaging accuracy of a motion-sensing camera in a first embodiment of the present invention.

Referring to FIG. 1, a first aspect of the present invention relates to a method S100 for regulating imaging accuracy of a motion-sensing camera. The method S100 comprises the following steps:

S110: Acquire an infrared speckle pattern in a target infrared scene.

S120: Based on the infrared speckle pattern, recognize an actual definition, an actual speckle regularity, and an actual central region brightness of the infrared speckle pattern.

S130: Compare the actual definition with a preset definition; and when the actual definition is consistent with the preset definition, proceed to step S140, or when the actual definition is inconsistent with the preset definition, adjust an imaging focal length of the motion-sensing camera (for example, adjust an imaging focal length of an infrared CMOS camera module described below) and repeat steps S110 to S130.

S140: Compare the actual speckle regularity with a preset speckle regularity; and when the actual speckle regularity is consistent with the preset speckle regularity, proceed to step S150, or when the actual speckle regularity is inconsistent with the preset speckle regularity, adjust the imaging focal length of the motion-sensing camera and repeat steps S110 to S140.

S150: Compare the actual central region brightness with a preset brightness; and when the actual central region brightness is consistent with the preset brightness, complete regulation of the imaging accuracy of the motion-sensing camera, or when the actual central region brightness is inconsistent with the preset brightness, adjust the imaging focal length of the motion-sensing camera and repeat steps S110 to S150.

In the method S100 for regulating imaging accuracy of a motion-sensing camera of this embodiment, an actual definition, an actual speckle regularity, and an actual central region brightness of an acquired infrared speckle pattern in a target infrared scene are recognized, and an imaging focal length of the motion-sensing camera is adjusted according to the actual definition, the actual speckle regularity, and the actual central region brightness, so as to obtain an infrared speckle pattern having required imaging accuracy. Thus, the quality of a depth map formed by conversion from the infrared speckle pattern can be highly improved, which provides a high-quality data source for subsequent skeleton-based recognition and gesture recognition.

Preferably, the method S100 further comprises the following step before step S110:

S101: Configure a light source unit, to emit infrared light to the target infrared scene, wherein the light source unit includes at least one light source. In order to improve regulation of imaging accuracy of the infrared speckle pattern of the motion-sensing camera, the light source preferably includes a structured light source.

Preferably, step S120 includes:
based on the infrared speckle pattern, recognizing an edge grey gradient of the infrared speckle pattern, and using the grey gradient as the actual definition.

Accordingly, step S130 includes:
comparing the edge grey gradient with a preset grey gradient, and when the edge grey gradient is consistent with the preset grey gradient, determining that the actual definition is consistent with the preset definition.

Description is made below by using an example in which an imaging focal length of an infrared CMOS camera module in the motion-sensing camera is adjusted.

Comparison is made between currently captured infrared speckle patterns. A great grey transition exists on the edge of a blurred speckle pattern, while a smooth grey transition exists on the edge of a clear infrared speckle pattern. Thus, unqualified lens due to greatly varying lens focal lengths can be directly determined. In this way, an infrared speckle pattern having required imaging accuracy can be further obtained. Thus, the quality of a depth map formed by conversion from the infrared speckle pattern can be highly improved, which provides a high-quality data source for subsequent skeleton-based recognition and gesture recognition.

Preferably, step S120 includes:
dividing the infrared speckle pattern into at least one target detection region; and recognizing a speckle distribution and/or speckle shape in each of the target detection region, and using the speckle distribution and/or speckle shape in the target detection region as the actual speckle regularity.

Accordingly, step S140 includes:
comparing the speckle distribution and/or speckle shape in each target detection region with a preset speckle distribution and/or preset speckle shape, and when the speckle distribution and/or speckle shape in the target detection region is consistent with the preset speckle distribution and/or preset speckle shape, determining that the actual speckle regularity is consistent with the preset speckle regularity.

Specifically, in the method S100 for regulating imaging accuracy of a motion-sensing camera of this embodiment, the detection of the infrared speckle regularity in the infrared CMOS camera module is further discrimination of the currently captured infrared speckle pattern. If there is high speckle regularity in the target detection region, the lens focal length needs to be finely adjusted while meeting a definition requirement. Because the speckle regularity is used to detect speckle patterns in a close range (greater than 1 m), effective discrimination cannot be made for a speckle pattern in a too close range due to highly concentrated speckles.

It should be noted that, the target detection region can be freely set. However, a speckle regularity detection scene should provide scene elements as rich as possible, and an empty scene is not recommended as the target detection region. The speckle distribution and/or speckle shape in the region is observed. If the speckle distribution is even and brightness distribution is appropriate, it can be determined that the infrared lens focal length meets an appropriate set value. In this way, an infrared speckle pattern having required imaging accuracy can be further obtained. Thus, the quality of a depth map formed by conversion using the infrared speckle pattern can be highly improved, which provides a high-quality data source for subsequent skeleton-based recognition and gesture recognition.

Preferably, step S120 includes:
selecting a predetermined range from a central region of the infrared speckle pattern; and calculating a whole brightness average value of the predetermined range in the central region of the infrared speckle pattern, and using the whole brightness average value as the actual central region brightness.

Step S150 includes:

comparing the whole brightness average value with a preset regional brightness threshold, and when the whole brightness average value is consistent with the preset regional brightness threshold, determining that the actual central region brightness is consistent with the preset brightness.

Specifically, in the method S100 for regulating imaging accuracy of a motion-sensing camera of this embodiment, the discrimination of the brightness of an infrared central region in the infrared CMOS camera module is a detection on a speckle pattern in a central region of a current image. In an ideal condition, the speckle pattern in the central region has a pattern with relatively uniform brightness. However, if the lens focal length is inappropriate, for example, if the focal length is too far or too close, an excessively large or small central bright speckle is generated. The foregoing two cases neither meet the high-quality requirement on the infrared speckles. Therefore, by adjusting the imaging focal length of the infrared CMOS camera module according to the brightness of the central region of the infrared speckle pattern, a clearer infrared speckle pattern can be obtained. In this way, an infrared speckle pattern having required imaging accuracy can be further obtained. Thus, the quality of a depth map formed by conversion from the infrared speckle pattern can be highly improved, which provides a high-quality data source for subsequent skeleton-based recognition and gesture recognition.

More specifically, the predetermined range may be of a fixed size of the central region of the infrared speckle pattern, for example, in the size of 150×150 pixels. The brightness of the central region is detected and an appropriate threshold is set. When a calculated regional value meets a required value, the focal length of the infrared CMOS camera module is no longer adjusted. Otherwise, the focal length is adjusted repeatedly till the set brightness threshold of the predetermined range is met.

A process of setting the brightness threshold of the predetermined range is as follows: Infrared speckle patterns are extracted from the same location region of infrared speckle patterns captured in the same scene and the same environment, and an average brightness value of this region is calculated as a brightness value of the infrared speckle patterns. Usually, a central region is selected. The central region becomes very bright when the focal length deviates a lot, while a brightness attenuation gradient from the central region of an ideal infrared speckle pattern to its perimeter is unlikely to sharply increase and an excessively large bright speckle is certainly not generated in the central region. It is generally recommended that an appropriate threshold is set to about 10% of a scene threshold.

In summary, the method S100 for regulating imaging accuracy of a motion-sensing camera of the present invention is easy and achieves a desired effect. By means of definition discrimination, speckle regularity discrimination, and discrimination of central region brightness, the present invention can intuitively reflect whether an infrared CMOS camera module reaches an ideal state and whether the focal length of its lens meets a required scene setting, thus providing a more accurate data source for subsequent depth calculation. The present invention provides a definition discrimination step: the edge grey gradient, whose spaced pixel numbers of continuous grey decline in each line of an image are the most, is regarded as the grey gradient in the line; and finally, the grey gradient of the whole image is calculated. The present invention also provides a speckle regularity discrimination step: a certain range is selected from a central region of a whole infrared speckle pattern for speckle regularity detection. Therefore, by use of the imaging accuracy regulating method of the present invention, the quality of a depth map formed by conversion from the infrared speckle pattern can be highly improved, which provides a high-quality data source for subsequent skeleton-based recognition and gesture recognition.

Figure 2:
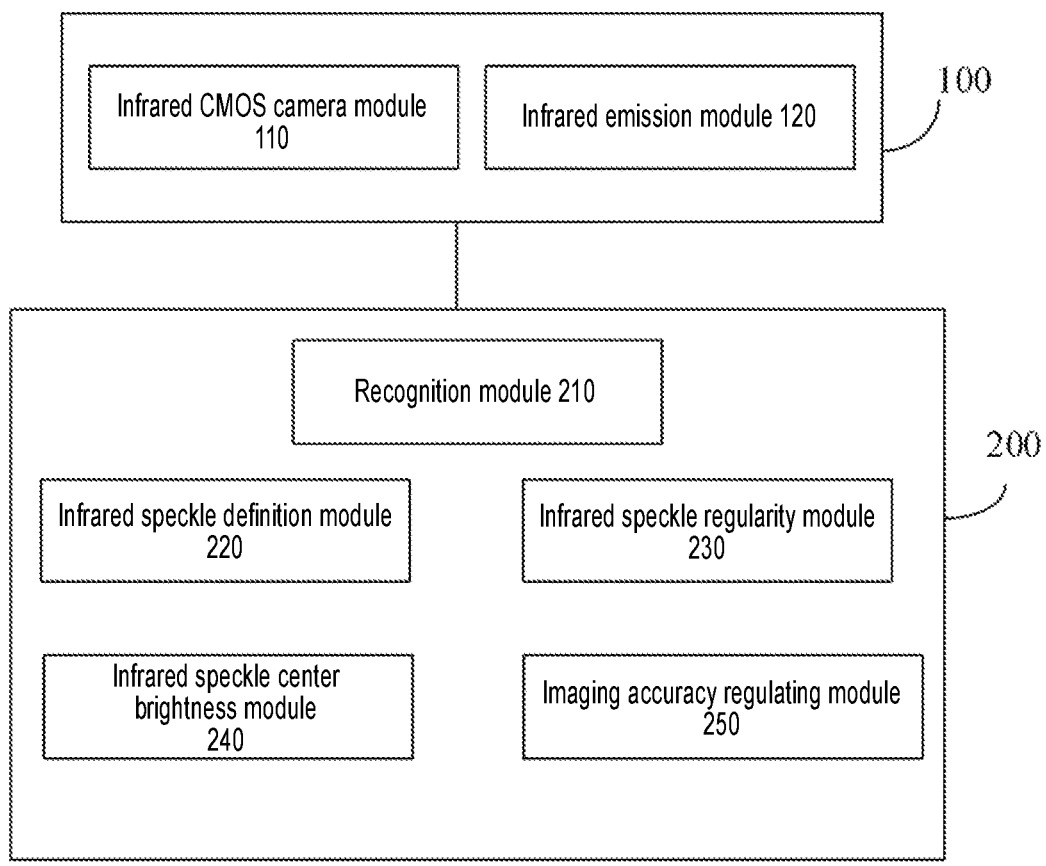
FIG. 2 is a schematic structural diagram of a device for regulating imaging accuracy of a motion-sensing camera in a second embodiment of the present invention.

As shown in FIG. 2, a second aspect of the present invention provides a device 200 for regulating imaging accuracy of a motion-sensing camera. The motion-sensing camera 100 comprises an infrared CMOS camera module 110. The regulating device comprises a recognition module 210, an infrared speckle definition module 220, an infrared speckle regularity module 230, an infrared speckle center brightness module 240, and an imaging accuracy regulating module 250.

The infrared CMOS camera module 110 is configured to acquire an infrared speckle pattern in a target infrared scene.

The recognition module 210 is configured to, based on the infrared speckle pattern, recognize an actual definition, an actual speckle regularity, and an actual central region brightness of the infrared speckle pattern.

The infrared speckle definition module 220 is configured to compare the actual definition with a preset definition; and when the actual definition is consistent with the preset definition, send a definition matching signal to the infrared speckle regularity module 230, or when the actual definition is inconsistent with the preset definition, send a definition mismatching signal to the imaging accuracy regulating module 250.

The infrared speckle regularity module 230 is configured to compare the actual speckle regularity with a preset speckle regularity; and when the actual speckle regularity is consistent with the preset speckle regularity, send a speckle regularity matching signal to the infrared speckle center brightness module 240, or when the actual speckle regularity is inconsistent with the preset speckle regularity, send a speckle regularity mismatching signal to the imaging accuracy regulating module 250.

The infrared speckle center brightness module 240 is configured to compare the actual central region brightness with a preset brightness; and when the actual central region brightness is consistent with the preset brightness, complete regulation of the imaging accuracy of the infrared CMOS camera module 110, or when the actual central region brightness is inconsistent with the preset brightness, send a brightness mismatching signal to the imaging accuracy regulating module 250.

The imaging accuracy regulating module 250 is configured to adjust an imaging focal length of the infrared CMOS camera module 110 according to the definition mismatching signal, the speckle regularity mismatching signal, and the brightness mismatching signal.

The device 200 for regulating imaging accuracy of a motion-sensing camera of this embodiment recognizes an actual definition, an actual speckle regularity, and an actual central region brightness of an acquired infrared speckle pattern in a target infrared scene, and adjusts an imaging focal length of the motion-sensing camera according to the actual definition, the actual speckle regularity, and the actual central region brightness, so as to obtain an infrared speckle pattern having required imaging accuracy. Thus, the quality of a depth map formed by conversion from the infrared speckle pattern can be highly improved, which provides a high-quality data source for subsequent skeleton-based recognition and gesture recognition.

Preferably, as shown in FIG. 2, the motion-sensing camera 100 also includes an infrared emission module 120 which includes a light source unit (not shown in the figure), configured to emit infrared light to the target infrared scene. The light source unit includes at least one light source (not shown in the figure).

Preferably, the recognition module 210 is configured to, based on the infrared speckle pattern, recognize an edge grey gradient of the infrared speckle pattern, and use the grey gradient as the actual definition.

The recognition module 210 is configured to divide the infrared speckle pattern into at least one target detection region, recognize a speckle distribution and/or speckle shape in each of the target detection region, and use the speckle distribution and/or speckle shape in the target detection region as the actual speckle regularity.

The recognition module 210 is configured to select a predetermined range from a central region of the infrared speckle pattern, calculate a whole brightness average value of the predetermined range in the central region of the infrared speckle pattern, and use the whole brightness average value as the actual central region brightness.

Preferably, the infrared speckle definition module 220 is configured to compare the edge grey gradient with a preset grey gradient, and when the edge grey gradient is consistent with the preset grey gradient, determine that the actual definition is consistent with the preset definition.

The infrared speckle regularity module 230 is configured to compare the speckle distribution and/or speckle shape in each target detection region with a preset speckle distribution and/or preset speckle shape, and when the speckle distribution and/or speckle shape in each of the target detection region is consistent with the preset speckle distribution and/or preset speckle shape, determine that the actual speckle regularity is consistent with the preset speckle regularity.

The infrared speckle center brightness module 240 is configured to compare the whole brightness average value with a preset regional brightness threshold, and when the whole brightness average value is consistent with the preset regional brightness threshold, determine that the actual central region brightness is consistent with the preset brightness.

It should be noted that, infrared light emitted by the infrared emission module 120 passes through several different processing modules before being emitted to a space. For example, invisible infrared light passes through a Wafer Level Optics (WLO) lens, and infrared light is then output to pass through a Diffractive Optical Element (DOE) and is finally projected into a spatial view of a rectangular pyramid. The light diffracted by the DOE produces random infrared speckles. These regular speckles vary in shape when contacting different persons and objects in the space. When the infrared CMOS camera module 110 photographs these infrared speckles of different shapes in the space, the resulting infrared speckle pattern intuitively reflects speckles with different regularity in different places and on different objects in the space. A regularity procedure of the speckles is another standard for measuring whether the focal length of an infrared lens is appropriate.

In summary, the device 200 for regulating imaging accuracy of a motion-sensing camera of the present invention has a simple structure and achieves a desired effect. By means of definition discrimination, speckle regularity discrimination, and discrimination of central region brightness, the present invention can intuitively reflect whether an infrared CMOS camera module reaches an ideal state and whether the focal length of its lens meets a required scene setting, thus providing a more accurate data source for subsequent depth calculation. For specific ways of definition discrimination, speckle regularity discrimination, and discrimination of the central region brightness, reference may be made to the above description, so the details are not described herein again. Therefore, by use of the imaging accuracy regulating device of the present invention, the quality of a depth map formed by conversion from the infrared speckle pattern can be highly improved, which provides a high-quality data source for subsequent skeleton-based recognition and gesture recognition.

It should be understood that the above embodiments are merely exemplary embodiments for illustrating the principle of the present invention, and the present invention is not limited thereto. Those of ordinary skill in the art can make various alterations and improvements without departing from the spirit and essence of the present invention. These alterations and improvements are deemed to fall within the protection scope of the present invention.

What is claimed is:

1. A method for regulating imaging accuracy of a motion-sensing camera, the method comprising: S 110: acquiring an infrared speckle pattern in a target infrared scene; S120 based on the infrared speckle pattern, recognizing an actual definition, an actual speckle regularity, and an actual central region brightness of the infrared speckle pattern; based on the infrared speckle pattern, recognizing an edge grey gradient of the infrared speckle pattern, and using the grey gradient as the actual definition; S130: comparing the actual definition with a preset definition; and when the actual definition is consistent with the preset definition, proceeding to step S140, or when the actual definition is inconsistent with the preset definition, adjusting an imaging focal length of the motion-sensing camera and repeating steps S110 to S130; S140: comparing the actual speckle regularity with a preset speckle regularity; and when the actual speckle regularity is consistent with the preset speckle regularity, proceeding to step S150, or when the actual speckle regularity is inconsistent with the preset speckle regularity, adjusting the imaging focal length of the motion-sensing camera and repeating steps S110 to S140; and S150: comparing the actual central region brightness with a preset brightness; and when the actual central region brightness is consistent with the preset brightness, completing regulation of the imaging accuracy of the motion-sensing camera, or when the actual central region brightness is inconsistent with the preset brightness, adjusting the imaging focal length of the motion-sensing camera and repeating steps S110 to S150.

2. The method for regulating imaging accuracy of a motion-sensing camera according to claim 1, wherein the method further comprises the following step before step S110:

S101: configuring a light source unit, to emit infrared light to the target infrared scene, wherein the light source unit comprises at least one light source.

3. The method for regulating imaging accuracy of a motion-sensing camera according to claim 2, wherein the light source comprises a structured light source.

4. The method for regulating imaging accuracy of a motion-sensing camera according to claim 1, wherein step S120 comprises:

based on the infrared speckle pattern, recognizing an edge grey gradient of the infrared speckle pattern, and using the grey gradient as the actual definition;

step S130 comprises:
comparing the edge grey gradient with a preset grey gradient, and when the edge grey gradient is consistent with the preset grey gradient, determining that the actual definition is consistent with the preset definition.

5. The method for regulating imaging accuracy of a motion-sensing camera according to claim 1, wherein
step S120 comprises:
dividing the infrared speckle pattern into at least one target detection region; and
recognizing a speckle distribution and/or speckle shape in each of the target detection region, and using the speckle distribution and/or speckle shape in the target detection region as the actual speckle regularity;
step S140 comprises:
comparing the speckle distribution and/or speckle shape in each of the target detection region with a preset speckle distribution and/or preset speckle shape, and when the speckle distribution and/or speckle shape in the target detection region is consistent with the preset speckle distribution and/or preset speckle shape, determining that the actual speckle regularity is consistent with the preset speckle regularity.

6. The method for regulating imaging accuracy of a motion-sensing camera according to claim 1, wherein
step S120 comprises:
selecting a predetermined range from a central region of the infrared speckle pattern; and
calculating a whole brightness average value of the predetermined range in the central region of the infrared speckle pattern, and using the whole brightness average value as the actual central region brightness;
step S150 comprises:
comparing the whole brightness average value with a preset regional brightness threshold, and when the whole brightness average value is consistent with the preset regional brightness threshold, determining that the actual central region brightness is consistent with the preset brightness.

7. The method for regulating imaging accuracy of a motion-sensing camera according to claim 2, wherein
step S120 comprises:
based on the infrared speckle pattern, recognizing an edge grey gradient of the infrared speckle pattern, and using the grey gradient as the actual definition;
step S130 comprises:
comparing the edge grey gradient with a preset grey gradient, and when the edge grey gradient is consistent with the preset grey gradient, deter pining that the actual definition is consistent with the preset definition.

8. The method for regulating imaging accuracy of a motion-sensing camera according to claim 3, wherein
step S120 comprises:
based on the infrared speckle pattern, recognizing an edge grey gradient of the infrared speckle pattern, and using the grey gradient as the actual definition;
step S130 comprises:
comparing the edge grey gradient with a preset grey gradient, and when the edge grey gradient is consistent with the preset grey gradient, determining that the actual definition is consistent with the preset definition.

9. The method for regulating imaging accuracy of a motion-sensing camera according to claim 2, wherein
step S120 comprises:
dividing the infrared speckle pattern into at least one target detection region; and
recognizing a speckle distribution and/or speckle shape in each of the target detection region, and using the speckle distribution and/or speckle shape in the target detection region as the actual speckle regularity;
step S140 comprises:
comparing the speckle distribution and/or speckle shape in each of the target detection region with a preset speckle distribution and/or preset speckle shape, and when the speckle distribution and/or speckle shape in the target detection region is consistent with the preset speckle distribution and/or preset speckle shape, determining that the actual speckle regularity is consistent with the preset speckle regularity.

10. The method for regulating imaging accuracy of a motion-sensing camera according to claim 3, wherein
step S120 comprises:
dividing the infrared speckle pattern into at least one target detection region; and
recognizing a speckle distribution and/or speckle shape in each of the target detection region, and using the speckle distribution and/or speckle shape in the target detection region as the actual speckle regularity;
step S140 comprises:
comparing the speckle distribution and/or speckle shape in each of the target detection region with a preset speckle distribution and/or preset speckle shape, and when the speckle distribution and/or speckle shape in the target detection region is consistent with the preset speckle distribution and/or preset speckle shape, determining that the actual speckle regularity is consistent with the preset speckle regularity.

11. The method for regulating imaging accuracy of a motion-sensing camera according to claim 2, wherein
step S120 comprises:
selecting a predetermined range from a central region of the infrared speckle pattern; and
calculating a whole brightness average value of the predetermined range in the central region of the infrared speckle pattern, and using the whole brightness average value as the actual central region brightness;
step S150 comprises:
comparing the whole brightness average value with a preset regional brightness threshold, and when the whole brightness average value is consistent with the preset regional brightness threshold, determining that the actual central region brightness is consistent with the preset brightness.

12. The method for regulating imaging accuracy of a motion-sensing camera according to claim 3, wherein
step S120 comprises:
selecting a predetermined range from a central region of the infrared speckle pattern; and
calculating a whole brightness average value of the predetermined range in the central region of the infrared speckle pattern, and using the whole brightness average value as the actual central region brightness;
step S150 comprises:
comparing the whole brightness average value with a preset regional brightness threshold, and when the whole brightness average value is consistent with the preset regional brightness threshold, determining that the actual central region brightness is consistent with the preset brightness.

* * * * *